United States Patent [19]
Kalish

[11] 3,737,713
[45] June 5, 1973

[54] HIGH VOLTAGE SUPPLY FOR DEPRESSED COLLECTOR TRAVELING WAVE

[75] Inventor: Joseph Kalish, New Milford, N.J.

[73] Assignee: International Telephone and Telegraph Corporation, Nutley, N.J.

[22] Filed: Jan. 17, 1972

[21] Appl. No.: 218,165

[52] U.S. Cl. .................. 315/3.5, 315/5.38, 330/43, 331/82, 323/16
[51] Int. Cl. .............................. H01g 25/34
[58] Field of Search ............... 330/43; 331/82; 315/3.5, 5.38; 323/16, 4

[56] References Cited

UNITED STATES PATENTS

| | | | |
|---|---|---|---|
| 3,165,696 | 1/1965 | Poole | 330/43 X |
| 3,566,180 | 2/1971 | Ewton | 315/3.5 |
| 3,369,188 | 2/1968 | Stover et al. | 330/43 |
| 3,573,536 | 4/1971 | Palmer | 330/43 |

Primary Examiner—Rudolph V. Rolinec
Assistant Examiner—Saxfield Chatmon, Jr.
Attorney—C. Cornell Remsen, Jr., Walter J. Baum, Paul W. Hemminger et al.

[57] ABSTRACT

This invention relates to a regulated power supply for a depressed collector traveling wave tube (TWT). Instead of requiring a high voltage regulated power supply across the cathode and helix of the TWT, a variable switching power supply generates the depressed collector voltage and is placed in series with the TWT collector to cathode power supply. The variable supply compensates for variations in the output of the collector to cathode supply to provide the regulated high voltage across the helix and cathode of the TWT.

2 Claims, 3 Drawing Figures

PATENTED JUN 5 1973 3,737,713

HIGH VOLTAGE SUPPLY FOR DEPRESSED COLLECTOR TRAVELING WAVE

BACKGROUND OF THE INVENTION

This invention relates to power supplies and more particularly to a regulated power supply for a depressed collector traveling wave tube.

When using a high voltage power supply, it is usually necessary to compromise between high efficiency and good regulation. Further, since high efficiency high voltage power supplies employing power transformers are large and heavy, efficiency is often sacrificed if space and weight considerations are of primary importance, as in airborne applications.

In typical depressed collector traveling wave tube arrangements, a highly regulated high voltage power supply across the cathode and helix of the tube is necessary. This presents the disadvantages typically associated with high voltage supplies such as corona effect, high energy dissipation and high cost.

SUMMARY OF THE INVENTION

It is an object of the present invention to provide a power supply for use in conjunction with a traveling wave tube which avoids the aforementioned disadvantages.

It is a feature of the present invention that a highly regulated high voltage power supply across the helix and cathode of the traveling wave tube need not be required.

According to a broad aspect of the invention there is provided an improved regulated power supply for a depressed collector traveling wave tube wherein there is provided an unregulated power supply for providing the required collector to cathode potential, and a variable power supply for providing the required collector to helix potential, wherein the improvement comprises means for sensing output variations of said unregulated power supply, means for generating error signals proportional to said variations and a variable power supply coupled in series with said unregulated power supply, said variable power supply responsive to said error signals, and the series combination of said unregulated supply and said variable supply providing the required traveling wave tube cathode to helix potential.

The above and other objects of the present invention will be better understood from the following detailed description taken in conjunction with the accompanying drawings, in which:

DESCRIPTION OF THE PREFERRED EMBODIMENT

Figure 1:
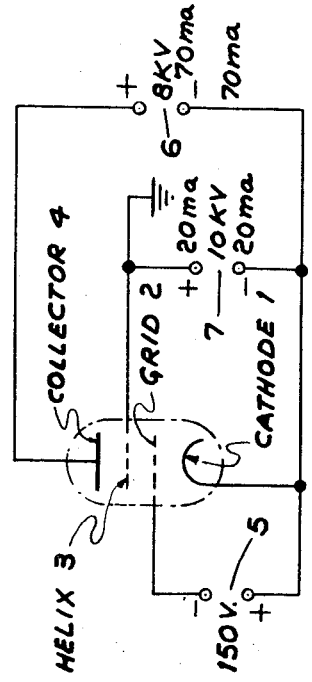
FIG. 1 is a schematic diagram of a typical power supply arrangement for a depressed collector traveling wave tube.

FIG. 1 shows a traveling wave tube having a cathode 1, grid 2, helix 3 and collector 4. The cathode-grid potential is supplied by a low voltage, typically 150 volts, regulated power supply 5. The cathode-collector potential is supplied by highly efficient, unregulated power source 6. This is a high voltage supply, typically 8kv generating a current of 70 milliamperes. However, to satisfy the requirements of a depressed collector traveling wave tube, the cathode-helix potential must be higher than the cathode-collector potential and must be highly regulated. This is supplied by high voltage, regulated power supply 7 generating, typically, 10kv at a current of 20 milliamperes. This supply is inefficient, expensive, heavy and occupies a great deal of space making it unsuitable for certain applications such as airborne applications where space, weight and energy dissipation are important considerations.

Figure 2:
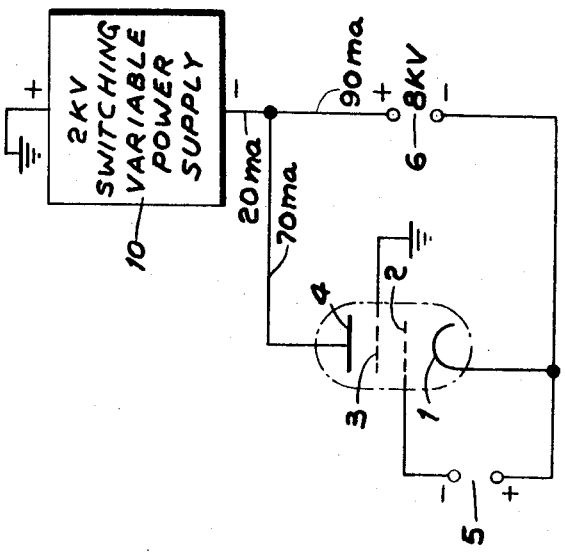
FIG. 2 is a schematic diagram of a power supply arrangement for a depressed collector traveling wave tube according to the present invention.

FIG. 2 shows a traveling wave tube and power supply arrangement according to the invention. Like parts have been denoted with like reference numerals. Instead of requiring high voltage supply 7 across the cathode 1 and helix 3 of the traveling wave tube as shown in FIG. 1, a variable switching power supply 10 is placed in series with the traveling wave tube collector power supply 6 to provide the regulated high voltage across the helix 3 and cathode 1 of the traveling wave tube. Variations in the output of power supply 6 are compensated for by variable power supply 10 whose output voltage can vary from 1kv to 3.5kv and whose nominal output voltage is 2kv.

Variable supply 10 supplies only a fraction of the cathode to helix potential i.e. the depressed collector to helix voltage. This improves reliability because the output inverter transformer, not shown, does not have to take the full power or output voltage stress. High efficiency is obtained since it is now determined by high efficiency unregulated power supply 6 and high efficiency switching power supply 10.

Figure 3:
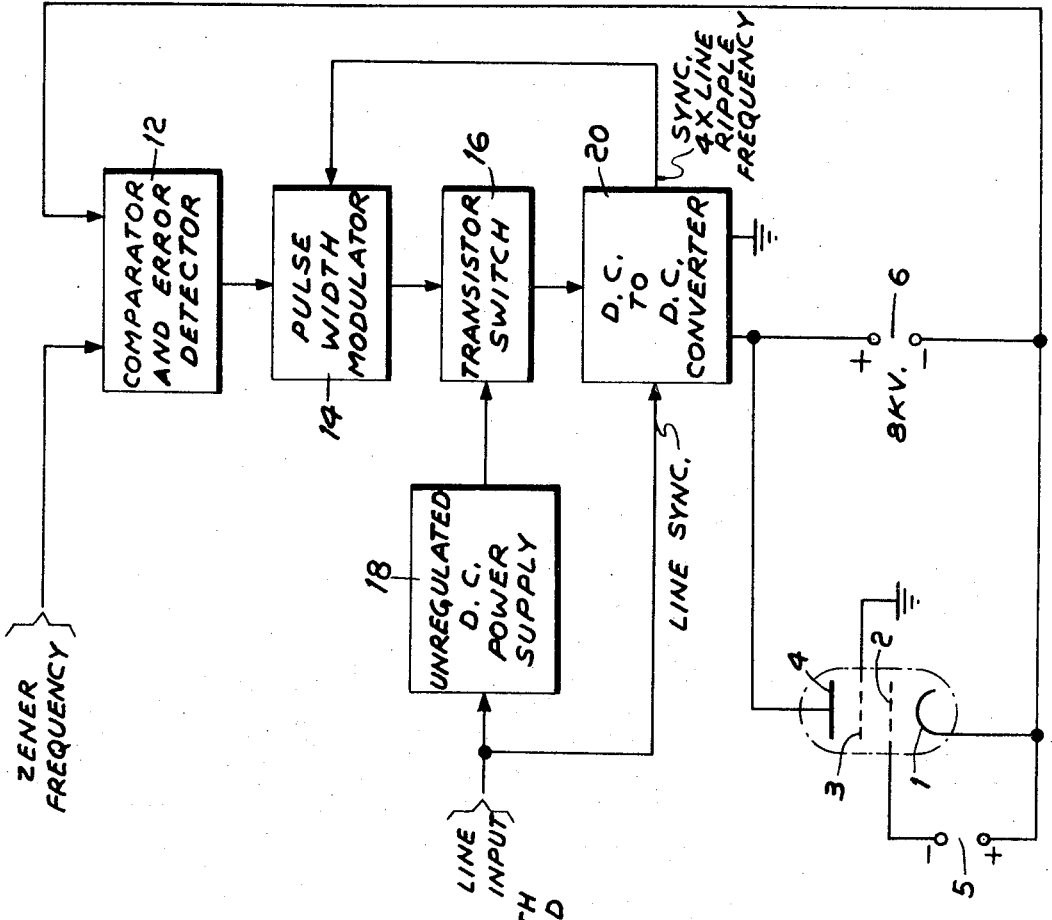
FIG. 3 illustrates, in more detail, the variable power supply of FIG. 2.

FIG. 3 shows in more detail how variable power supply 10 operates. The cathode to helix voltage 6 is compared with a reference potential in voltage comparator and error detector 12. The reference potential can be developed across a zener diode, not shown by known methods. If the cathode to helix voltage 6 has deviated from its nominal value, an error signal will be generated by comparator and error detector 12. The error signal is applied to pulse width modulator 14 whose output is a square wave having a duty cycle proportional to the magnitude of the error signal. The square wave signal controls transistor switch 16 which alternately connects and disconnects the output of low voltage DC power supply, typically 500 volts. The output of transistor switch 16 is a dc signal proportional to the length of time the switch is closed as determined by modulator 14. For example, if power source 18 is a 500 volt dc source and the output of modulator 14 is a square wave having a 50 percent duty cycle, the output of switch 16 will be a 250 volt DC signal. The output of switch 16 is fed to a DC to DC converter 20 which generates the DC component necessary for complementing power source 6 and providing the required cathode to helix potential. Pulse width modulator 14 is synchronized to four times the line ripple to simplify stability problems.

It should be clear that the use of the lower voltage, variable switching power supply results in a reduction in size and weight, increased reliability and higher efficiency. For example, referring to FIG. 1, if power supply 6 is a 560 watt (kv × 70 ma) supply and is 90 percent efficient, it must generate 560/0.9 watts or 622 watts. If power supply 7 is a 200 watt (10kv × 20 ma) supply and is 70 percent efficient, it must generate 200/0.7 watts or 286 watts. A total of 62 watts plus 86 watts, or 148 watts are dissipated.

In the arrangement shown in FIG. 2, power supply 6 is a 720 watt (8kv × 90 ma) supply, but must generate 800 watts of power due to its 90 percent efficiency. To keep the total power to the traveling wave tube constant, variable power supply 10 must contribute 40 watts of energy. Due to its 70 percent efficiency, it must therefore generate 57 watts of energy. In this case, a total of 80 watts plus 17 watts or 97 watts are dissipated. This is seen to be an improvement over the 148 watts dissipated when using the prior art arrangement.

It is to be understood that the foregoing description of specific examples of this invention is made by way of example only and is not to be considered as a limitation on its scope.

I claim:

1. An improved regulated power supply for a depressed collector traveling wave tube wherein there is provided an unregulated power supply for providing the required collector to cathode potential, wherein the improvement comprises:

a variable power supply coupled in series with said unregulated power supply, the series combination of said unregulated supply and said variable supply providing the required traveling wave tube cathode to helix potential, said variable power supply comprising:

a source of a reference signal; means for comparing said reference signal with the output of said unregulated supply; and means coupled to said comparing means and responsive to the difference of said reference signal and the cathode to helix voltage for generating a voltage proportional to said difference, which voltage complements said unregulated power supply for supplying the required cathode to helix potential.

2. An improved regulated power supply according to claim 1 wherein said means for generating includes:

a pulse width modulator responsive to the difference between said reference signal and the cathode to helix voltage, said modulator having a square wave output whose duty cycle is proportional to said difference;

a DC power supply;

a switch coupled to said pulse width modulator and said DC power supply for generating an error signal whose amplitude is proportional to the duty cycle of said square wave; and a DC to DC converter responsive to the output of said switch for generating the required dc component which compliments said unregulated power supply for suppling the required cathode to helix potential.

* * * * *